(12) United States Patent
Bissmeyer

(10) Patent No.: US 11,675,675 B1
(45) Date of Patent: *Jun. 13, 2023

(54) EXTENDED REMOTE COPY CONFIGURATOR OF THREE-SITE DATA REPLICATION FOR DISASTER RECOVERY

(71) Applicant: WELLS FARGO BANK, N.A., San Francisco, CA (US)

(72) Inventor: Scott Davis Bissmeyer, Homewood, AL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,408

(22) Filed: May 10, 2022

Related U.S. Application Data

(63) Continuation of application No. 16/878,784, filed on May 20, 2020, now Pat. No. 11,360,861, which is a continuation of application No. 15/689,731, filed on Aug. 29, 2017, now Pat. No. 10,671,493.

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1464* (2013.01); *G06F 2201/805* (2013.01); *G06F 2201/82* (2013.01)

(58) Field of Classification Search
CPC ............ G06F 11/1451; G06F 11/1458; G06F 11/1464; G06F 11/1469; G06F 11/1471; G06F 11/2058; G06F 11/2064; G06F 11/2074; G06F 11/2076
See application file for complete search history.

(56) References Cited

U.S. PATENT DOCUMENTS

| | | |
|---|---|---|
| 7,523,408 B2 | 4/2009 | Barrios et al. |
| 7,571,292 B2 | 8/2009 | McClure |
| 7,647,525 B2 | 1/2010 | Lecrone et al. |
| 7,992,031 B2 | 8/2011 | Chavda et al. |
| 8,121,966 B2 | 2/2012 | Routray et al. |
| 8,359,491 B1 | 1/2013 | Bloomstein |
| 8,375,004 B2 | 2/2013 | Kondo et al. |

(Continued)

OTHER PUBLICATIONS

Brooks et al., "Tivoli Storage Management Concepts," Aug. 2000, IBM.

(Continued)

*Primary Examiner* — Elmira Mehrmanesh
(74) *Attorney, Agent, or Firm* — Kilpatrick Townsend & Stockton LLP

(57) ABSTRACT

Configuration and replication can be managed across multiple sites for datacenter volumes. A visual representation of a current configuration for a first of a plurality of replication techniques can be conveyed for display on a display device. Changes can be made to the current configuration, producing a future configuration. The future configuration can be analyzed for replication errors, and an updated visual representation can be produced that identified discovered replication errors and highlights differences between the current configuration and the future configuration. The updated visual representation can be conveyed, for display on a display device.

20 Claims, 12 Drawing Sheets

(56) References Cited

U.S. PATENT DOCUMENTS

| | | | |
|---|---|---|---|
| 8,386,729 B2 | 2/2013 | McClure | |
| 8,463,751 B2 | 6/2013 | Kottomtharayil | |
| 9,344,498 B2 | 5/2016 | Clayton et al. | |
| 9,384,255 B2 | 7/2016 | Wilkinson | |
| 9,405,628 B2 | 8/2016 | Blea et al. | |
| 10,037,251 B1 | 7/2018 | Bono et al. | |
| 10,671,493 B1 | 6/2020 | Bissmeyer | |
| 11,360,861 B1 * | 6/2022 | Bissmeyer | G06F 11/1451 |
| 2004/0260902 A1 | 12/2004 | Stanley et al. | |
| 2008/0010496 A1 | 1/2008 | Das et al. | |
| 2009/0063575 A1 | 3/2009 | Blea et al. | |
| 2009/0300409 A1 | 12/2009 | Bates et al. | |
| 2009/0313428 A1 | 12/2009 | De Jong | |
| 2015/0081628 A1 | 3/2015 | Brown et al. | |
| 2015/0121122 A1 | 4/2015 | Towstopiat et al. | |
| 2015/0286428 A1 | 10/2015 | Dain et al. | |
| 2015/0286429 A1 | 10/2015 | Dain et al. | |
| 2015/0286431 A1 | 10/2015 | Dain et al. | |
| 2015/0286545 A1 | 10/2015 | Brown et al. | |

OTHER PUBLICATIONS

Lovelace et al., "IBM Tivoli Storage Productivity Center for Replication for System z," May 2014, IBM.

Rooney et al., "IBM TotalStorage Productivity Center for Replication for z/OS," IBM Systems Journal, 2008, pp. 681-694, vol. 47, No. 4, Rooney, McBride, and Hanif.

* cited by examiner

```
Edit Dataset
Save  Exit

#Master Designation
# MASTER:qqqqqqqq:hhhhhhhh
#       MASTER   - Means this line is to define the Master session parameters
#       qqqqqqqq - master session name
#       hhhhhhhh - sysplex name of the pprc/hyperswap environment, used for IR only

MASTER: MASTER1 ;FRDPLEX

######## LC951 Copy Once Sessions - runs with 25% buffers
####3DMC1A
#BMCO3P:
```

FIG. 5

EXTENDED REMOTE COPY CONFIGURATOR OF THREE-SITE DATA REPLICATION FOR DISASTER RECOVERY

CROSS REFERENCE TO RELATED APPLICATIONS

This application is a continuation of U.S. patent application Ser. No. 16/878,784, filed May 20, 2020, now issued U.S. Pat. No. 11,360,861, and entitled Extended Remote Copy Configurator of Three-Site Data Replication for Disaster Recovery, which is a continuation of U.S. patent application Ser. No. 15/689,731, filed Aug. 29, 2017, now issued U.S. Pat. No. 10,671,493, and entitled Extended Remote Copy Configurator of Three-Site Data Replication for Disaster Recovery. The entirety of each of the above-mentioned applications is incorporated herein by reference.

BACKGROUND

In a z/OS (mainframe) environment, a disaster recovery solution is done at the DASD (Direct Access Storage Device) level. For every primary DASD volume, a target DASD volume is configured for replicating the primary DASD volume. There are multiple forms of replication, synchronous and asynchronous, and multiple z/OS technologies to perform this replication.

Peer to Peer Remote Copy or PPRC is a protocol to replicate a storage volume to another control unit in a remote site. Synchronous PPRC causes each write to the primary volume to be performed to the secondary as well, and the input/output (I/O) is only considered complete when update to both primary and secondary have completed. Asynchronous PPRC will flag tracks on the primary to be duplicated to the secondary when time permits. PPRC can be used to provide very fast data recovery due to failure of the primary site. In IBM zSeries computers with two direct access storage device (DASD) control units connected through dedicated connections, PPRC is the protocol used to mirror a DASD volume in one control unit (the primary) to a DASD volume in the other control unit (the secondary). In the IBM SAN Volume Controller PPRC is used to mirror a virtualized storage volume to remote (or the same) cluster.

Extended Remote Copy or XRC is an IBM zSeries and System z9 mainframe computer technology for data replication. It combines supported hardware and z/OS software to provide asynchronous replication over long distances. XRC is complementary to IBM's Peer to Peer Remote Copy (PPRC) service, which is designed to operate either synchronously or asynchronously over shorter distances. XRC as a z/OS copy services solution can be compared to Global Mirror for ESS, which is a controller-based solution for either the open systems or z/Series environments. Both Global Mirror for ESS (Asynchronous PPRC) and XRC (Global Mirror for z/Series) are asynchronous replication technologies, although their implementations are somewhat different. Extended Remote Copy or XRC is now known as Global Mirror for z/Series (XRC). XRC is a z/Series asynchronous disk mirroring technique which is effective over any distance. XRC keeps the data time consistent across multiple ESS (Enterprise Storage Server) or HDS (Hitachi Data Systems) disk subsystems at the recovery site. XRC functions as a combination of disk (IBM ESS or HDS licensed) Microcode and application code running on a z/Series host and provides a recovery point that is time consistent across multiple disk subsystems. The host component of the software is called the System Data Mover or SDM. The SDM ensures that no dependent writes are made out of sequence and data residing on the secondary volumes will always provide a time consistent copy of the primary volumes being mirrored.

While these technologies perform active replication, meaning data is being mirrored constantly, a point-in-time technology called Flashcopy is also used. Flashcopy is responsible for creating a point-in-time copy of a DASD volume, to a target DASD volume, such that the target volume can become instantly available for both read and write use. In some instances, this Flashcopy function is utilized to build out a disaster recovery datacenter, along with a stand-in environment.

All DASD volumes need to become replicated across all three (3) sites, and also part of appropriate Flashcopy groups in order to maintain a complete and consistent disaster recovery solution. Management of the replication methods and configurations across all three (3) sites for every individual DASD device is a monumental task, and validating configurations prior to putting them into production is essential in order to prevent DASD volumes from being missed from replication that would result in lost data in the event of a real disaster.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One aspect of the innovation provides techniques or systems for a three-site disaster recovery solution between primary, secondary and tertiary data centers. In particular, a graphical user interface provides validation and visibility in volumes being replicated by two or more copy technologies are provided herein.

In one or more embodiments, the present disclosure provides a method for configuring data replication in a three-site disaster recovery solution. The method includes replicating data using a first copy technology, by a system data mover executing on an information handling system. The data are replicated from more than one primary volume of storage devices at a primary datacenter to corresponding more than one secondary volume at secondary datacenter. The replication is performed according to a first copy technology configuration data structure. The method includes maintaining a second copy technology configuration data structure based on the first copy technology configuration data structure. The system data mover replicates the data using a second copy technology using more than one session from the more than one primary volume of storage devices at the primary datacenter to corresponding more than one tertiary volume at tertiary datacenter. The replication is made according to a second copy technology configuration data structure. A graphical user interface presents the more than one session of replicating the data using the second copy technology including: (i) one or more characteristics of the more than one session; (ii) identified volumes that are in each session; and (iii) any additions or removals of volumes per session.

In one or more embodiments, the present disclosure provides an information handling system for configuring data replication in a three-site disaster recovery solution, the information handling system includes system memory containing a system data mover and a graphical user interface. The information handling system includes a network interface in communication with a primary datacenter, a secondary datacenter, and a tertiary data center. The information handling system includes a processor subsystem in communication with the system memory and the network interface. The system data mover executed by the processor subsystem causes the information handling system to replicate data using a first copy technology. More than one primary volume of storage devices at a primary datacenter are replicated to corresponding more than one secondary volume at secondary datacenter according to a first copy technology configuration data structure. The system data mover also replicates the data using a second copy technology using more than one session from the more than one primary volume of storage devices at the primary datacenter to corresponding more than one tertiary volume at tertiary datacenter according to a second copy technology configuration data structure. The processor executes the graphical user interface to cause the information handling system to maintain a second copy technology configuration data structure based on the first copy technology configuration data structure. The graphical user interface presents the more than one session of replicating the data using the second copy technology. The graphical user interface in particular presents (i) one or more characteristics of the more than one session; (ii) identified volumes that are in each session; and (iii) any additions or removals of volumes per session.

In one or more embodiments, the present disclosure provides a computer-readable storage medium comprising computer-executable instructions, which when executed via a processing unit on a computer performs acts. The acts include replicating data using a first copy technology, by a system data mover executing on an information handling system, from more than one primary volume of storage devices at a primary datacenter to corresponding more than one secondary volume at secondary datacenter according to a first copy technology configuration data structure. The acts include maintaining a second copy technology configuration data structure based on the first copy technology configuration data structure. The acts include replicating the data using a second copy technology using more than one session, by the system data mover executing on the information handling system, from the more than one primary volume of storage devices at the primary datacenter to corresponding more than one tertiary volume at tertiary datacenter according to a second copy technology configuration data structure. The acts include presenting the more than one session of replicating the data using the second copy technology in in a graphical user interface comprising: (i) one or more characteristics of the more than one session; (ii) identified volumes that are in each session; and (iii) any additions or removals of volumes per session.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

FIG. 5 illustrates a depiction of the graphical user interface presenting an edit dataset window, according to one or more embodiments;

DETAILED DESCRIPTION

Figure 1:
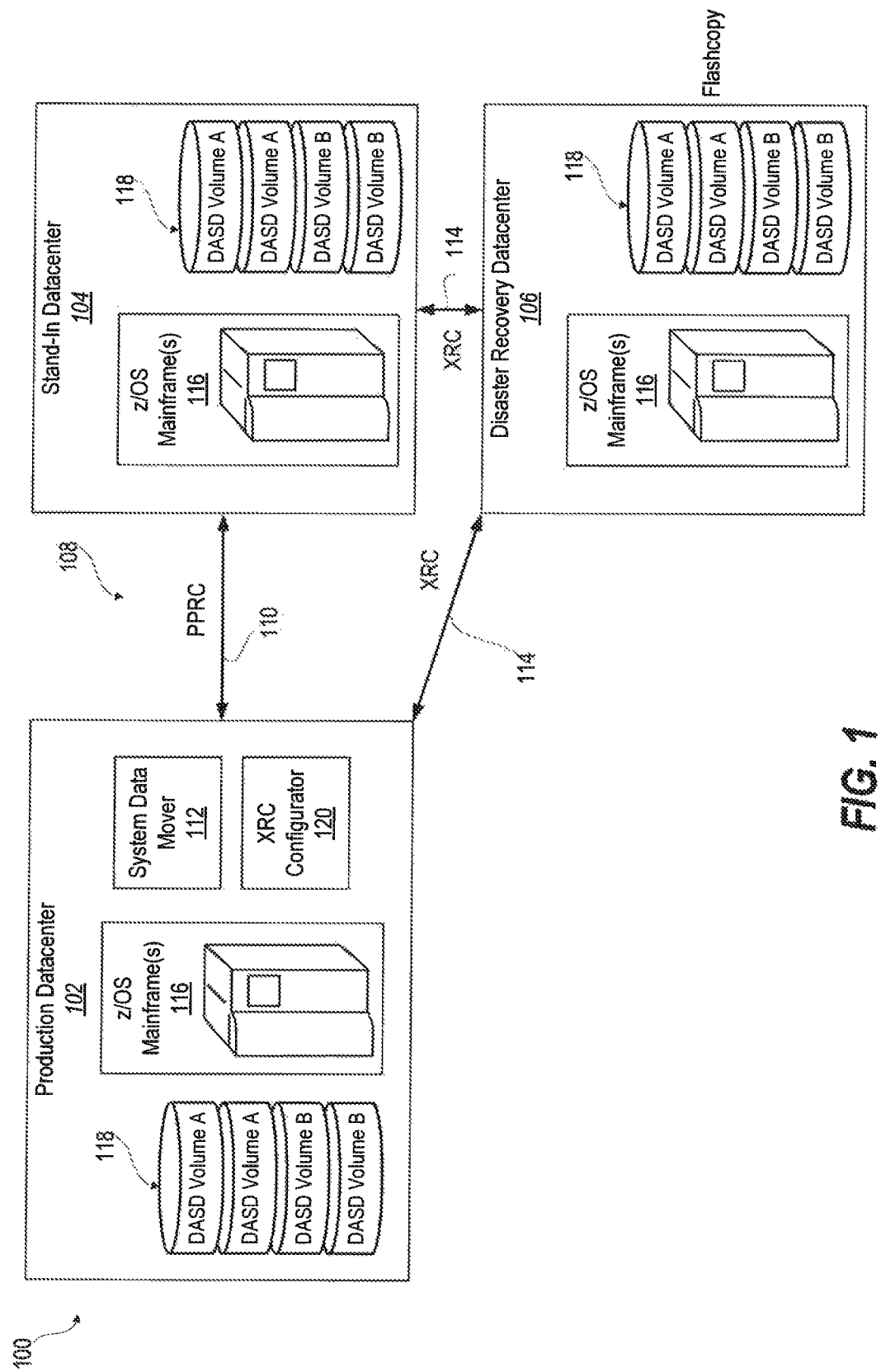
FIG. 1 illustrates a block diagram of a system for three-site data duplication, according to one or more embodiments.

A system, method, and computer-readable storage medium enable configuring data replication in a three-site disaster recovery solution by replicating data from more than one primary volume of storage devices at a primary datacenter using a first copy technology to a secondary data center and using a tertiary copy technology to a tertiary data center. A graphical user interface presents the sessions of replicating the data using the second copy technology including: (i) one or more characteristics of the sessions; (ii) identified volumes that are in each session; and (iii) any additions or removals of volumes per session.

Embodiments or examples illustrated in the drawings are disclosed below using specific language. It will nevertheless be understood that the embodiments or examples are not intended to be limiting. Any alterations or modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure. As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Turning to the Drawings, FIG. 1 illustrates a system 100 in a specific location having a primary production datacenter 102, a secondary stand-in datacenter 104, and a tertiary disaster recover datacenter 106. It can be appreciated that the system may be located in any acceptable location. In one embodiment, a network 108 that connects the datacenters 102, 104, 106 includes short distance communication link 110 between production datacenter 102 and stand-in datacenter 104 that support synchronous peer to peer remote copy (PPRC) by a system data mover 112. The network 108 that connects the datacenters 102, 104, 106 includes long distance communication link 114 between stand-in datacenter 104 and disaster recovery datacenter 106 that support asynchronous extended remote copy (XRC) by the system data mover 112. z/OS mainframes 116 of the production datacenter 102 utilize direct access storage devices (DASD) volumes 118 that are duplicated at the stand-in datacenter 104 and disaster recovery datacenter 106. While the system data mover 112 and the XRC configurator 120 are illustrated as internal to the production datacenter 102, it is to be appreciated that either or both may be located in or connected to any one of the datacenters 102, 104, and 106. In one embodiment, both the system data mover 112 and the XRC configurator 120 are located in the disaster recovery datacenter 106.

The present disclosure provides a mixture of both synchronous PPRC and asynchronous XRC to achieve a consistent three (3) site solution across three (3) datacenters in three (3) geolocations. eXtended Remote Copy (XRC) is a software product provided by IBM to replicate data asynchronously from one volume to another. This technology depends on the creation of a session, which is responsible for managing a set of volumes within a set of LCUs (Logical Control Units). Each session can combine with multiple sessions to become a cluster, so that all sessions can be recovered to a single consistent point in time.

In one or more embodiments, the present innovation provides an XRC Configurator 120 that is a GUI program. In an exemplary embodiment, the XRC Configurator 120 supports Windows, Linux, and OSX and is written in Python. The XRC Configurator 120 allows users to manage and validate their three (3) site replication solution who use XRC to replicate data asynchronously and Flashcopy for their recovery point. The XRC Configurator 120 provides a visible way for users to add and remove volumes, LCUs, and sessions to and from the XRC environment. This process will also dynamically move volumes from what is referred herein as Copy Once XRC sessions, which are sessions which contain volumes that do not need to be mirrored continuously, configure all appropriate pacing levels, and then provide a visual aid to validate any movement of DASD volumes 118 against the existing XRC configuration. The XRC Configurator 120 then takes all this information and forms the necessary configuration file needed by GDPS to facilitate the active XRC environment.

IBM provides a software product called GDPS® that helps automate starting and monitoring of sessions based on a provided configuration. This configuration outlines every session, the system it should run on, and every DASD volumes' assigned pacing value. GDPS® is a multi-site or single-site end to end application availability solution that provides the capability to manage remote copy configuration and storage subsystems (including IBM TotalStorage Enterprise Storage Server), to automate Parallel Sysplex operation tasks and perform failure recovery from a single point of control. GDPS helps automate recovery procedures for planned and unplanned outages to provide near-continuous availability and disaster recovery capability.

One challenge to managing this XRC environment is a limitation to the number of DASD volumes (65535) that can be defined to a system or LPAR (Logical PARtition). This may be difficult for an XRC type Sysplex since XRC type Sysplex needs access to three (3) sets of DASD volumes (Site1, Site2, and Site3). Because of this, the XRC type Sysplex has been broken into three (3) sets called LCSS's (Logical Channel Subsystem), where each LCSS can have the same DASD volume number (DEVN) defined to multiple sets. This can mean that the ending GDPS configuration may have the same DEVN number associated with multiple sessions.

In addition to managing and validating XRC data, XRC Configurator 120 can also be used to manage the Flashcopy configuration. Since Flashcopy can support one source DASD volume 118 to multiple target DASD volumes 118, so too does XRC Configurator 120 in the form of 'Flashcopy sets'. Multiple Flashcopy sets can be used to perform either a full datacenter recovery, or a partial recovery into a stand-in environment. What is unique about the Flashcopy configuration managed by XRC Configurator 120 is it utilizes the XRC session information in order to generate the Flashcopy configuration. DASD Volumes should not be used unless they have been made consistent by XRC during a 'recovery' process, and by Flashcopying all volumes within an XRC session, this provides the necessary 'recovery' information for volumes to be used in any environment.

In one example according to the innovation, at installation, the user provides the location of various types of information. The first is the DASD hardware configuration, where each file (or single file) contains an excel sheet that outlines each sites volume address, LCU, and subsystem information. It also needs an Excel sheet defining each session 'infrastructure' dataset information used by XRC to journal data and maintain consistency. It then asks for the locations of the existing GDPS XRC and PPRC configurations, so that the visual aids and internal configuration checks can assist in validating a user's intended action. Lastly, the user is asked which DASD subsystems belong to which LCSS so that DEVN information can be validated properly with both PPRC and Flashcopy configurations.

During normal use, the user defines all the sessions and LCUs needed by the active XRC environment using some short configuration work provided by the GUI. The program then takes this information, along with all the previously defined information to provide a visual look of what the ending configuration will look like. The program will also provide the necessary validation information for the user to confirm any adding/removing/moving of DASD volumes/LCUs/sessions.

The user may also provide the Flashcopy set configuration information which can be used to generate the necessary configuration that eventually performs the requested Flashcopies. This configuration is created by the user, similar to the XRC configuration, and can be used to validate any changes that might have occurred.

For a typical use case, the user will update the XRC configuration to either add or remove volumes and then use a configuration Wizard to walk them through creating and placing the updated XRC and Flashcopy configuration information.

The XRC Config01 Builder assists in managing an extremely complex XRC configuration. In one example according to the innovation, in an MzGM environment, a large number of copy once volumes (paging, temporary dataset volumes, etc.), asymmetric volumes (Couple dataset volumes, system volumes, etc.) and other exceptions exist which results in a GDPS/XRC CONFIG01 many thousands of lines in length. This CONFIG01 is not presented in a user-friendly format and is nearly unmanageable with storage management often moving dozens of copy once volumes at a time.

According to the innovation, in one example the XRC Config01 Builder tool has the following functions:
(1) Edit the SESSIONS member used as input to build the CONFIG01. When done the program can rename the old CONFIG01 to a BKxxxxx member and upload the new CONFIG01;
(2) Edit the FLASHSET member used as input to build the FLASH datasets (SYSOK.**.ALLVOLUMES, etc.). When done the program can rename the old FLASH datasets and upload the new ones;
(3) Compare the PPRC Config01 against the XRC Config01 to ensure all PPRCed data is also XRCed, and via versa;
(4) Check Write Pacing against the SYS1.XCOPY. PACING.VALUES dataset and submit jobs in SDMPLEX to correct pacing as necessary; and
(5) Check volsers in Production and XRC Query data against SYS1.XCOPY.PACING.VALUES dataset to ensure volumes that should be in C1 datamovers are in C1 datamovers.

Figure 2:
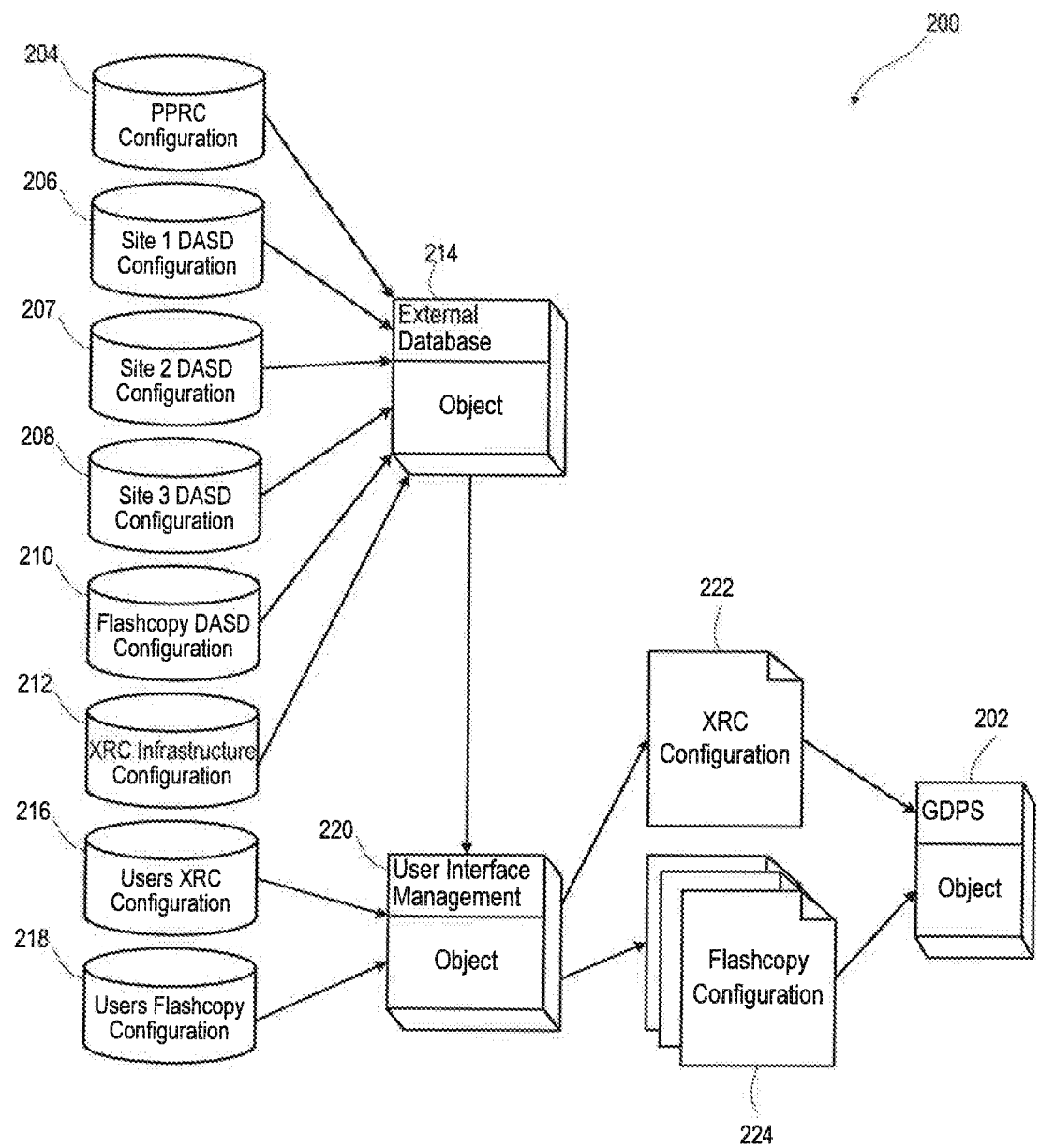
FIG. 2 illustrates an information flow of configuration data used for three-site data duplication, according to one or more embodiments.

FIG. 2 illustrates an information flow 200 for forming configuration information as a GDPS object 202 used to manage the three-site data duplication. PPRC configuration data 204, site 1 DASD configuration data 206, site 2 DASD configuration data 207, site 3 DASD configuration data 208, Flashcopy DASD configuration data 210 and XRC infrastructure configuration data 212 are used to build an external database object 214. The external database object 214, users XRC configuration data 216, and users flashcopy configuration data 218 created by the XRC Configurator 120 (FIG. 1) are combined to create a user interface management object 220 that produces an XRC configuration file 222 and Flashcopy configuration file(s) 224. The system data mover 112 (FIG. 1) consumes the XRC and Flashcopy configuration files 222, 224 to create the GDPS object 202.

Input Files Used by the XRC Config01 Builder: The XRC Config01 builder tool uses input files from a variety of sources. In one example, the input file may be on SharePoint, including sources that reside on the z/OS host. Various input files are described below.

In an example according to the innovation, the following input files are on SharePoint. It is to be understood that most any configuration of filenames, file types, and input may be used.

(1) FIRSTCITY_DASD_Current_Future is an Excel Spreadsheet maintained by Storage Management for a FIRSTCITY Production environment. It contains SITE1 and SITE2 device numbers, box names, and serial numbers that the XRC Config01 Builder uses as input. The file with the highest version number is used.
(2) SECONDCITY_DASD_Current_Future is an Excel Spreadsheet maintained by Storage Management for a SECONDCITY SDMPLEX, high availability (HA), and business continuity planning (BCP) environments. SECONDCITY_DASD_Current_Future contains SITE3 device numbers, box names, and serial numbers. SECONDCITY_DASD_Current_Future also contains SITE2 device numbers as addressed by SDMPLEX, as well as HA and BCP LCU & device layouts. The file with the highest version number is used.
(3) SDMPLEX XRC Infrastructure Datasets is an Excel Spreadsheet maintained by Data Replication with the layout of state, control, journal, and other XRC infrastructure datasets in SDMPLEX. It is used to help build the FLASH input datasets. Certain infrastructure datasets must be included in a Flashcopy to meet XRECOVER requirements. The file with the highest version number is used.

In an example according to the innovation, the following input files are on the z/OS Host. It is to be understood that most any configuration of filenames, file types, and input may be used.
(1) SYS1.NVS.GDPSPARM(CONFIG01) in SDMPLEX is the GDPS/XRC Config. It is downloaded by the program to view existing config and compare it to any changes the user might be interested in making. It is replaced and renamed to a BKxxyyy (xx=year, yyy=Julian date) member when the new config is created.
(2) SYS1.NVS.GDPSPARM(CONFIG01) in PRDPLEX is the GDPS/PPRC Config. It is downloaded by the program and used to compare against the GDPS/XRC config if the user wishes to ensure that all PPRCed devices are also XRC'ed via an option described below.
(3) SYS1.XCOPY.PACING.VALUES in SDMPLEX is the dataset defining what volume prefixes should be set to what pacing level in XRC. It is downloaded by the program and used to compare against XQUERYs that are dynamically generated and submitted by the program when checking write pacing via an option described below. This file uses the format: (a) VOLSER_PREFIX PACING_VALUE COMMENT. For Example: PSPX 8 JES2 SPOOL; (b) VOLSER_PREFIX: Can only be 6 characters long, and no replacement characters are supported (e.g. *, &, @). The first matching prefix in the list is used; (c) PACING_VALUE: This is a hex value ranging from 0-F. If the X is used, this indicated that this volume should be a copy once volume, and pacing values are irrelevant; (d) COMMENT: This can contain anything you'd like, as long as it doesn't go beyond a single line.
(4) SYS1.XCOPY.VOLLIST in PRDPLEX is a dataset with a list of Production volsers. It is generated when the REFRESH VOLSERS box is checked in XRC Config Builder and a Load Config is executed. This is used to check and see what volumes are not in a copy once session but should be, which assists with Copy Once related changes.
(5) SYS1.XCOPY.VOLLIST.JCL in PRDPLEX is a job that is submitted by the XRC Config01 Builder when the 'REFRESH VOLSERS' check box is checked and a Load Config is executed. The job generates a new copy of the SYS1.XCOPY.VOLLIST dataset described above.

(6) SYS1.XCOPY.BUILDER(FLASHSET) in SDMPLEX is a configuration file used for building the Flashcopy datasets.

(7) SYS1.XCOPY.BUILDER(SESSIONS) in SDMPLEX is a configuration file used for building the GDPS/XRC Config01.

Configuration: SYS1.XCOPY.BUILDER(FLASHSET) in SDMPLEX is the main input used to build the Flashcopy datasets and can be edited within the program. It is split into sections (Flashsets) that define the sessions associated with each section. The first line in each section indicates the MASTER job for the Zero Suspend Flashcopy and the device the XRC MASTER dataset is located on. The next part of each section defines the datamovers and the subordinate ZSF job names associated with each of them. The final part of each section indicates what range of source LCUs flashes to what range of target LCUs on each subsystem.

Terms for SYS1.XCOPY.BUILDER(FLASHSET) includes:
(i) flashset indicates the name of the group used to distinguish each set of flash definitions;
(ii) master_device indicates the device used in the source parameter of the flashcopy of the MASTER dataset;
(iii) target_lcu indicates the 2 digit, hex value of the target lcu value used in the zero suspend flashcopy parameter for the MASTER dataset;
(iv) session—indicates the session used to store the flashcopy parameters for the master dataset;
(v) session_name indicates the XRC session to be used that will define the list of source volumes to flash (XRC secondary volumes only);
(vi) jobname is the job name that will be used when either the master or subordinate jobs are submitted to execute the flashcopy;
(vii) PID (static definition of Parent IDentifier) is used by the zero suspend flashcopy program to determine which job is the Parent, and not a subordinate;
(viii) JID (static definition of the Job IDentifier) is used by the zero suspend flashcopy program to determine which job is a subordinate, and not a parent;
(ix) box_name indicates the name of the box where the LCU definitions relate to. This name is also used to reference the boxes' serial number from the secondary excel spreadsheet (flashcopy requires the use of a serial number);
(x) starting_source_lcu defines the starting 2 digit hex LCU number in a range of LCU numbers used as the source in a flashcopy relationship. This value is incremented until it equals that of the ending_source_lcu value. In addition, this value incrementally mapped to the starting_target_lcu value. If the range of source LCU's is not equal to the mapped range of target LCU's, the program will throw an error;
(xi) ending_source_lcu defines the ending in 2 digit hex LCU number in a range of LCU numbers used as the source in a flashcopy relationship. If the range of source LCU's is not equal to the mapped range of target LCU's, the program will throw an error;
(xii) starting_target_lcu defines the starting 2 digit hex LCU number in a range of LCU numbers used as the target in a flashcopy relationship. This value is incremented until it equals that of the ending_target_lcu value. In addition, this value incrementally mapped to the starting_source_lcu value. If the range of source LCU's is not equal to the mapped range of target LCU's, the program will throw an error;
(xiii) ending_target_lcu defines the ending 2 digit hex LCU number in a range of LCU numbers used as the target in a flashcopy relationship. If the range of source LCU's is not equal to the mapped range of target LCU's, the program will throw an error;
(xiv) MASTER defines the master information for a given flashset definition. This is used to indicate where the master dataset is going to be flashed to, and what the jobname of the master (or PID) job will be;
(xv) BOX defines the information needed about all XRC secondary subsystems to perform a Zero Suspend Flashcopy. The only necessary piece of information needed is the mapping of source LCU and target LCU. It is assumed that the CCA values will be the same between the source and target devices. In addition, more than one Box definition can be used for a single box name, in cases where lcu ranges need to be split apart.

Master definition for SYS1.XCOPY.BUILDER(FLASHSET) is flashset:MASTER:PIDjobname:master_device:target_lcu:session. For example: ALLVOLUMES:MASTER: PIDXOKT3MST:0060:2A:SDM32E.

Session definition for SYS1.XCOPY.BUILDER(FLASHSET) is: flashset:session_name:JIDjobname.

For Example: ALLVOLUMES:SDM31A:JIDXOKSUB1A:

BOX definition for SYS1.XCOPY.BUILDER(FLASHSET) is flashset:BOX:box_name:starting_source_lcu:ending_source_lcu:starting target_lcu:ending_target_lcu. For Example: ALLVOLUMES:BOX:SECBOX02:40:49:00:09, ALLVOLUMES:BOX:SECBOX03:40:4D:00:0D SYSLXCOPY.BUILDER(SESSIONS) in SDMPLEX is the main input used to build the GDPS/XRC Config01. It can be edited within the program. It defines the MASTER session, the CLUSTERs, and each of the datamovers. Copy once volumes are specified individually with exclamation points in front of their DEVNs within the Copy once datamovers. They are automatically excluded from being part of normal datamovers by appearing in the Copy Once sections. More information on understanding this member is found at the top in the comment section. Terms include:
(i) MASTER indicates this definition will define the parameters of the XRC master session;
(ii) master_name indicates the name of your XRC master session;
(iii) sysplex indicates the name of the GDPS/PPRC sysplex. This is used for IR implementations only;
(iv) session_name defines the name of the XRC session. When the same session_name is used for multiple definitions, they are combined to form one session. In special cases, if the name is 'IGNORE', then the defined device number or LCUs will be ignored in all XRC sessions.
(v) session_type indicates the type of XRC session that will be used (XRC, MIGRATE, MZ GM, MIGMZ GM);
(vi) primary_lpar defines the gdps lpar name of the primary location of the XRC session
(vii) alternate_lpar defines the gdps lpar name of the alternate location of the XRC session, in a case where the XRC session needs to change LPARs;
(viii) primary_box defines the name of the box of the XRC primary devices that are to be defined in the LCU definitions;

(ix) secondary_box defines the name of the box of the XRC secondary devices that are to be defined in the LCU definitions;
(x) starting_primary_lcu defines the starting 2 digit hex LCU value in a range that ends with ending_primary_lcu. This range is incrementally mapped to the starting_secondary_lcu value. Alternatively, this value can also contain a single primary device number, which is used to mirror a single device instead of an entire LCU. If a device number is to be provided, it must be preceded by a '!';
(xi) ending_primary_lcu defines the ending 2 digit hex LCU value in a range that begins with starting_primary_lcu. This range is incrementally mapped to the starting_secondary_lcu value. ALTERNATE: This value can also contain a single secondary device number, which is used to mirror a single device instead of an entire LCU. If a device number is to be provided, it must be preceded by a '!';
(xii) starting secondary lcu defines the starting 2 digit hex LCU value in a range that is incremented with the starting_primary_lcu value. This range is incrementally mapped to the starting_primary_lcu value. If devices are provided for starting_primary_lcu and ending_primary_lcu then this parameter is ignored;
(xiii) num_readers defines the number of reader devices this definition contains. The device used for the reader is defined by the reader_cca. If the value of this parameter is greater than 1, there are 3 possible results: (1) If the LCU values provided in this definition are substituted with a primary and device pair ('!'), then the program will return an error; (2) If the MR parameter is set to 'Y', then all volumes defined in a given LCU will be mapped to a group of readers. This results in consecutive reader entries, followed by the consecutive device entries in the resulting XRC Config01; or (3) If the MR parameter is set to 'N', then all volume defined in a given lcu will be evenly divided and mapped to the number of readers defined. For instance if there are 100 devices in an LCU, and num_readers was given a value of 2, the first 50 devices would belong to one reader, and the next 50 would belong to the next reader. Note that when using the XRC function Multi-Reader (MR), there is typically only 1 device defined (meaning num_readers is set to a value of 1) because the remaining readers are defined as PAV volumes. For a GDPS/XRC config, where PAV Multi-Reader's are used, only the base devices need to be defined. If the Multi-Reader environment does not use PAV's, and uses multiple base devices, then num_readers should have a value greater than 1 with the MR definition set to 'Y'
(xiv) reader_cca defines the CCA value of the reader within the already provided box and lcu definitions. In the case where num_readers is greater than 1, this value is incremented by 1 until all reader requirements have been fulfilled;
(xv) MR indicates whether a session definition will have Multi-Reader capabilities. This is a function of XRC to allow multiple XRC Readers to be defined as one group;
(xvi) storage_control defines a 2 digit alphanumeric value given to the XRC session to group devices and readers accordingly. Typically each LCU gets its own storage control value. In the case where a range of LCUs are provided, they are all given the same storage control value;
(xvii) cluster_name defines the associated XRC cluster-name the session will belong to. This can be given any name up to 8 characters. It can also be given the master session name if there is a session that does not require a cluster; and
(xviii) errorlvl is an optional parameter that defaults to SESSION. To define a session with an XRC error level other than SESSION, this optional parameter can place it at the end of the definition.

Master definition for SYS1.XCOPY.BUILDER(SESSIONS) is MASTER:master_name:sysplex. For Example: MASTER:MASTER1:PRDPLEX.

Session definition for SYS1.XCOPY.BUILDER(SESSIONS) is session_name:session_type:primary_lpar:alternate_lpar:primary_box:secondary_box:starting_primary_lcu:ending_primary_lcu:starting_secondary_lcu:num_readers:reader_cca:MR:storage_cont rol:cluster_name:errorlvl.
For example (LCU):
SDM1:MZGM:NVS01:NVS02:PRIBOX1:SECBOX1:00: 00:40:1:01:Y:AA:CLUSTER1.
For example (Device):
SDMC1A:MIGMZGM:NVS01::PRIBOX1:SECBOX1:! C90A:!2A0A:##:1:00:N:AA:

XRC Config Builder.conf is the main configuration file used by the program. It contains a wide variety of settings, including links to the wide variety of files described in the Input files used by the XRC Config Builder. XRC Config Builder.conf also defines standards for box names that the XRC Config Builder expects to see, LCSSes and what boxes should be associated with what LCSS in SDMPLEX, etc. It should never need to be changed by a typical user of this program. The XRC Config Builder.comf is comprised of the following categories:

Category: Volser Lookup:

TABLE A

| Parameter | Value type | Description |
| --- | --- | --- |
| volser ipaddress | IP address or URL | The address of the MVS host where the volser dataset resides |
| volser query dataset | MVS Dataset | Dataset containing a list of device numbers mapped to volsers (SYS1.XCOPY.VOLLIST) |
| volser build dataset job | MVS Dataset | Dataset containing the jcl that builds the volser dataset |
| volser query timing | Number | Number of seconds to wait before each interval when trying to download the volser dataset |
| volser query intervals | Number | The maximum number of attempts to download the volser dataset |

Category: PPRC Config

TABLE B

| Parameter | Value type | Description |
| --- | --- | --- |
| pprc config01 ipaddress | IP address or URL | The address of the MVS host where the GDPS/PPRC Config01 member resides |
| pprc config01 dataset | MVS Dataset | The dataset where the GDPS/PPRC Config01 member resides |

Category: XRC Config

TABLE C

| Parameter | Value type | Description |
| --- | --- | --- |
| xrc config01 ipaddress | IP address or URL | The address of the MVS host where the GDPS/XRC Config01 member resides |
| xrc config01 | MVS | The dataset where the GDPS/XRC Config01 |

TABLE C-continued

| Parameter | Value type | Description |
| --- | --- | --- |
| dataset | Dataset | member resides |
| backup confi01 name | MVS Dataset | Dataset where a backup of the GDPS/XRC Config01 member will be placed. File patterns are accepted for substitution: $YEAR and $JULIAN |
| parmlib | MVS Dataset | Dataset where all the XRC Parmlib members reside |
| Jcllib | MVS Dataset | Dataset where all the XRC JCL members reside (this is currently not used) |

Category: Flashcopy Config

TABLE D

| Parameter | Value type | Description |
| --- | --- | --- |
| flashcopy ipaddress | IP address or URL | The address of the MVS host where the Flashcopy datasets resides |
| flashcopy datasets | MVS Dataset | The Flashcopy datasets, file patterns are accepted: $FLASHSET $SESSION |
| backup flashcopy datasets | MVS Dataset | Dataset pattern where a backup of the Flashcopy datasets will be placed. File patterns are accepted for substitution: $YEAR, $JULIAN, $FLASHSET, and $SESSION |

Category: Sessions Config:

TABLE E

| Parameter | Value type | Description |
| --- | --- | --- |
| sessions ipaddress | IP address or URL | The address of the MVS host where the SESSIONS member resides |
| flashsets | MVS Dataset | Dataset of the FLASHSETS member |
| backup flashsets | MVS Dataset | Dataset of the backup FLASHSETS member |
| sessions | MVS Dataset | Dataset of the SESSIONS member |
| backup sessions | MVS Dataset | Dataset of the backup SESSIONS member |

Category: Devn Lookup

TABLE F

| Parameter | Value type | Description |
| --- | --- | --- |
| sdmplex directory | Sharepoint Directory | Directory where the secondary device definition excel spreadsheet resides |
| prdplex directory | Sharepoint Directory | Directory where the primary device definition excel spreadsheet resides |
| sdmplex file pattern | Text | Filename pattern of the secondary device definition excel spreadsheet |
| prdplex file pattern | Text | Filename pattern of the primary device definition excel spreadsheet |
| sdmplex worksheet | Text | Worksheet pattern of the secondary device definition worksheet within the excel spreadsheet |
| prdplex worksheet | Text | Worksheet pattern of the primary device definition worksheet within the excel spreadsheet |
| site1 box names | Comma Separated List | List of potential site1 box names. Wildcard can be used '*' |
| site2 box names | Comma Separated List | List of potential site2 box names. Wildcard can be used '*' |
| secondary box names | Comma Separated List | List of potential secondary box names. Wildcard can be used '*' |

TABLE F-continued

| Parameter | Value type | Description |
| --- | --- | --- |
| number lcsss | Number | Number of LCSS's in the XRC environment |
| lcss1 boxes | Comma Separated List | Box names that are mirrored from LCSS1 |
| lcss1 sessions | Comma Separated List | Session names that are mirrored from LCSS1 |
| lcss2 boxes | Comma Separated List | Box names that are mirrored from LCSS2 |
| lcss2 sessions | Comma Separated List | Session names that are mirrored from LCSS2 |

Category: Infrastructure

TABLE G

| Parameter | Value type | Description |
| --- | --- | --- |
| excel directory | Sharepoint Directory | Directory where the infrastructure dataset definition excel spreadsheet resides |
| excel pattern | Text | Filename pattern of the infrastructure dataset definition excel spreadsheet |
| excel worksheet | Text | Worksheet pattern of the worksheet within the infrastructure dataset definition excel spreadsheet |

Category: Pacing Config

TABLE H

| Parameter | Value type | Description |
| --- | --- | --- |
| pacing ipaddress | IP address or URL | The address of the MVS host where the pacing definition dataset resides |
| pacing definition dataset | MVS Dataset | The MVS dataset of the pacing definitions |

Category: Pacing Query Definitions

TABLE I

| Parameter | Value type | Description |
| --- | --- | --- |
| query ipaddress | IP address or URL | The address of the MVS host where the XRC Queries will be submitted. Substitutions allowed: $SYSTEM |
| temp dataset | MVS Dataset | The MVS dataset where the query results will be sent. Substitutions allowed: $USER, $SYSTEM |
| systems | Comma Separated List | List of GDPS system definitions. Each definition is a combination of MVS LPAR name and GDPS netview name separated by a comma, and grouped in parenthesis. EX: (LPAR1, NVS01) |

Figure 3:
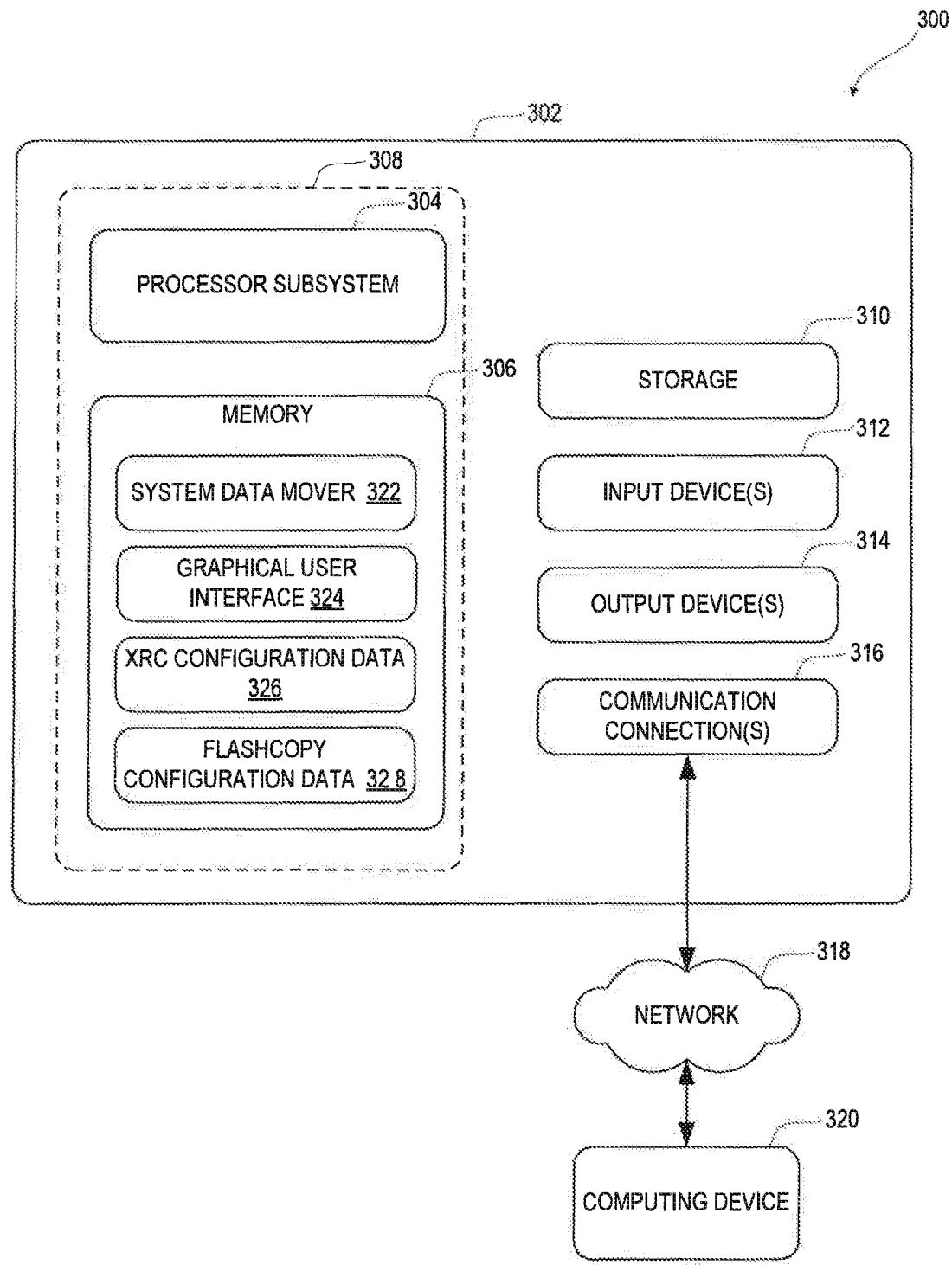
FIG. 3 illustrates a block diagram of an information handling system for configuring three-site data replication, according to one or more embodiments.

FIG. 3 and the following discussion provide a description of a suitable computing environment to implement embodiments of one or more of the provisions set forth herein. The operating environment of FIG. 3 is merely one example of a suitable operating environment and is not intended to suggest any limitation as to the scope of use or functionality of the operating environment. Example computing devices include, but are not limited to, personal computers, server computers, multiprocessor systems, mid-range computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions is combined or distributed as desired in various environments.

FIG. 3 illustrates a system 300 including a computing device 302 configured to implement one or more embodiments provided herein. In one configuration, computing device 302 includes at least one processing unit 304 and memory 306. Depending on the exact configuration and type of computing device, memory 306 may be volatile, such as RAM, non-volatile, such as ROM, flash memory, etc., or a combination of the two. This configuration is illustrated in FIG. 3 by dashed line 308.

In other embodiments, device 302 includes additional features or functionality. For example, device 302 may include additional storage such as removable storage or non-removable storage, including, but not limited to, magnetic storage, optical storage, etc. Such additional storage is illustrated in FIG. 3 by storage 310. In one or more embodiments, computer readable instructions to implement one or more embodiments provided herein are in storage 310. Storage 310 may store other computer readable instructions to implement an operating system, an application program, etc. Computer readable instructions may be loaded in memory 306 for execution by processing unit 304, for example.

The term "computer readable media" as used herein includes computer storage media. Computer storage media includes volatile and nonvolatile, removable and non-removable media implemented in any method or technology for storage of information such as computer readable instructions or other data. Memory 306 and storage 310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 302. Any such computer storage media is part of device 302.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 302 includes input device(s) 312 such as keyboard, mouse, pen, voice input device, touch input device, infrared cameras, video input devices, or any other input device. Output device(s) 314 such as one or more displays, speakers, printers, or any other output device may be included with device 302. Input device(s) 312 and output device(s) 314 may be connected to device 302 via a wired connection, wireless connection, or any combination thereof. In one or more embodiments, an input device or an output device from another computing device may be used as input device(s) 312 or output device(s) 314 for computing device 302. Device 302 may include communication connection(s) 316 to facilitate communications via a network 318 with one or more other computing devices 320.

Certain functionalities of three-site data duplication can be performed by software applications resident in memory 306, such as a system data mover 322 and graphical user interface 324. The graphical user interface 324 can modify XRC configuration data structure or file 326 and flashcopy configuration data structure or file 328 for use by the system data mover 322.

Figure 4:
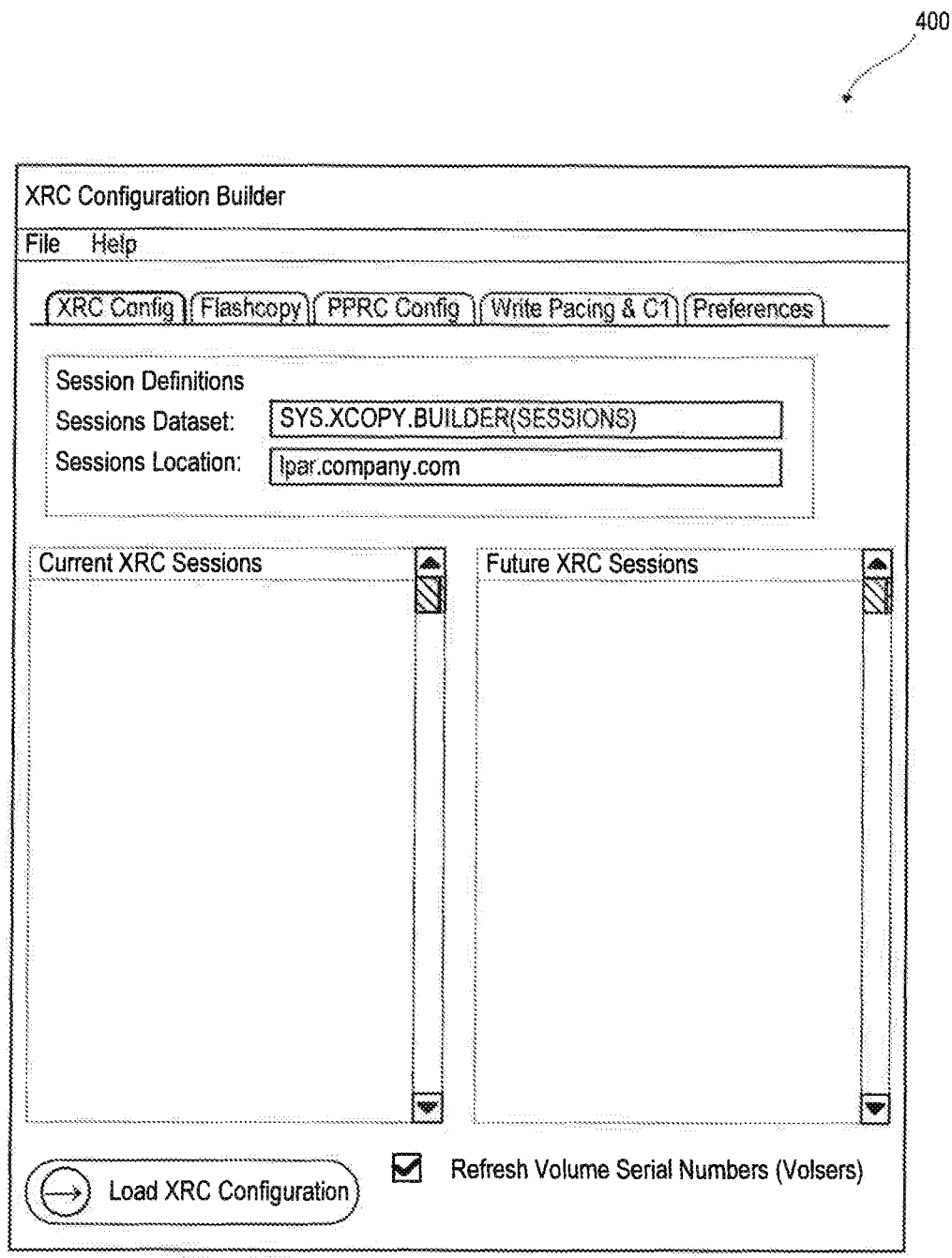
FIG. 4 illustrates a depiction of a graphical user interface presenting an extended remote copy (XRC) configuration window, according to one or more embodiments.

FIG. 4 illustrates a graphical user interface (GUI) window 400 generated by the XRC Config01 Builder. From here there are six (6) options to make: 'XRC Config', 'Flashcopy', 'PPRC Config', 'Write Pacing & C1', 'Preferences', or File->Create Config.

XRC Config: This tab is used to review the current and any possible future XRC changes. The screen is split up into 3 basic sections: Session Definitions, Current XRC Sessions, and Future XRC Sessions.

The Session Definitions section allows the user to manipulate the SESSIONS document that defines all the data used in the 'Future XRC Sessions'.

Figure 6:
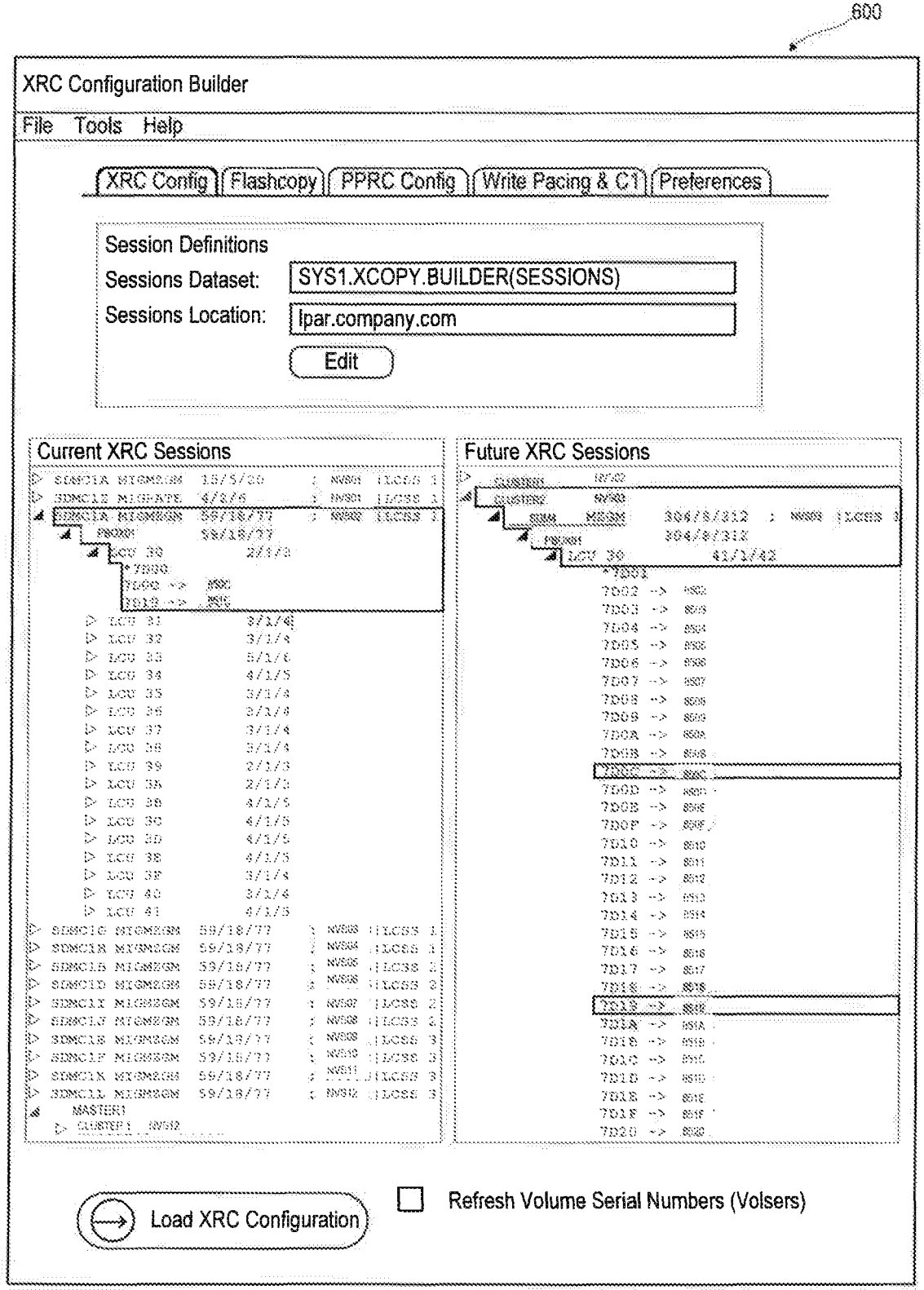
FIG. 6 illustrates a depiction of the graphical user interface presenting an XRC configuration builder window, according to one or more embodiments.

FIG. 5 illustrates a GUI window 500 for editing a dataset. Once in the edit screen, the user is provided with text edit functions: copy, paste, undo, etc. When it comes time to save the document, a backup of the original is first created and uploaded to the 'Backup SESSIONS dataset' definition given in preferences (currently SYS1.XCOPY.BUILDER (SESSBKUP)). Once all the intended changes are made to the SESSIONS document, the user can then move on to 'Load XRC Config'. When this button is pressed, the current GDPS/XRC Config01 member is downloaded and displayed. Then the SESSIONS document is downloaded and displayed as well. The resulting panels show the user what is currently in place and what will be built with sections highlighted in red or green to show the differences. Removed items are shown in red. New items are shown in green. For instance, if a volume is moved from a copy once session and place in a normal session, the 'Current XRC Sessions' side will have a datamover/device highlighted in red, and the 'Future XRC Sessions' side will have a datamover/device highlighted in green. For example:

FIG. 6 illustrates a GUI window 600 for monitoring and modifying XRC sessions. Some other useful items when browsing the sessions other than highlighting include: (i) Session name; (ii) Session type; (iii) The number of volumes being mirrored (not including readers); (iv) The number of readers being used; (v) (vi) The primary GDPS netview name the session resides; (vii) Which LCSS the session belongs to; (viii) Which Cluster/Master session name the session belongs to; (ix) Which boxes and LCUs are defined to a session; and (x) Which volumes are replicated, and which are readers (indicated by a preceding '*' character).

Figure 7:
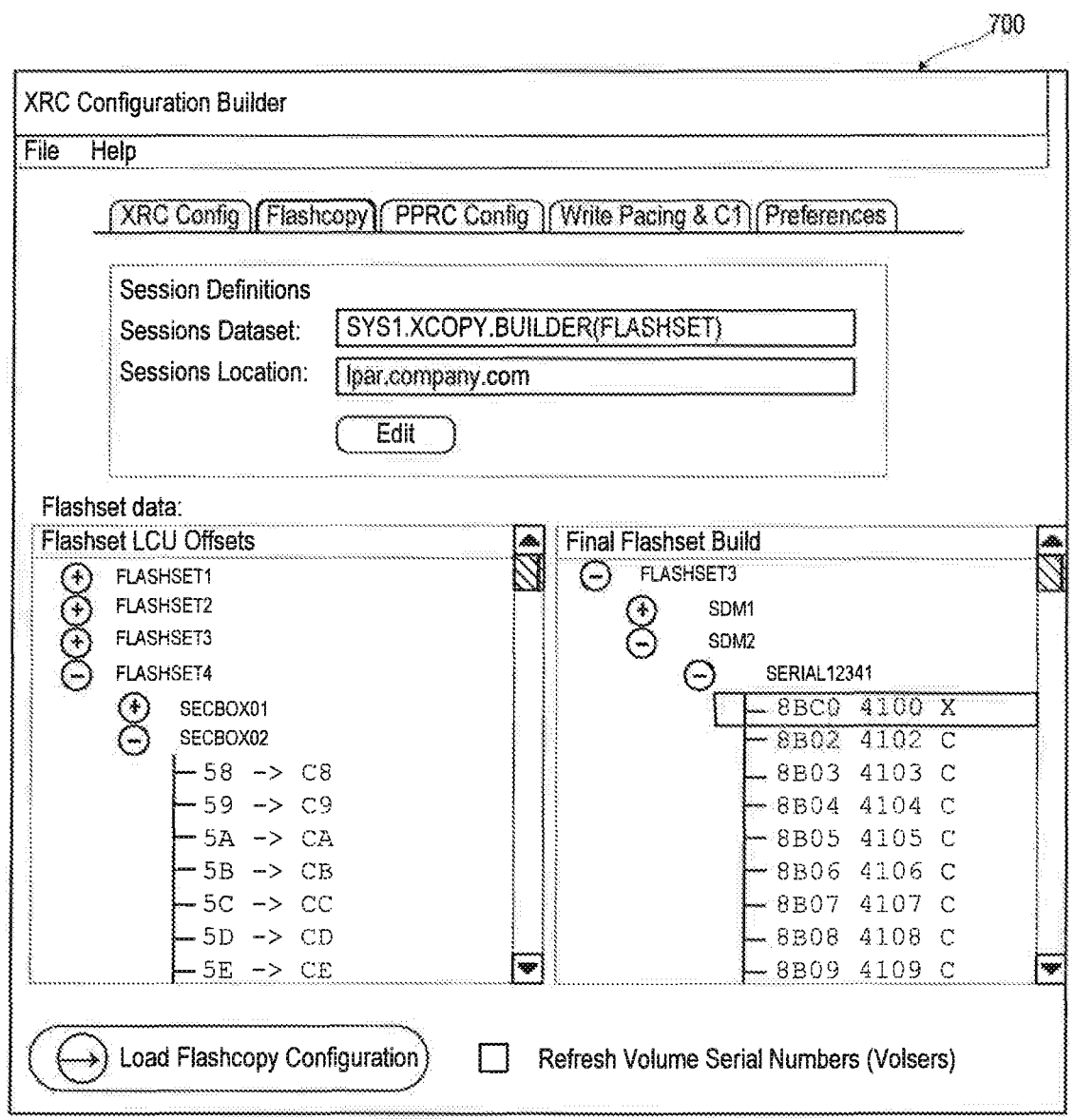
FIG. 7 illustrates a depiction of the graphical user interface presenting an Flashcopy configuration builder window, according to one or more embodiments.

Flashcopy: The Flashcopy tab is used to help with defining and viewing all the flashcopy source and target volumes. Like the 'XRC Config' tab, this is broken up into two (2) major sections, the top where the user can modify your FLASHSET document, and the bottom where the user can view/analyze the FLASHSET information. In the 'Flashset Definitions' section at the top, the user can use the 'Edit' button to modify your FLASHSET dataset. In the 'Flashset Data:' section on the lower half of the page, the user can view any changes that the user has made to the FLASHSET dataset. If the user presses the 'Load Flashcopy Config' button, the user might see the output like the following:

FIG. 7 illustrates a GUI window 700 for monitoring and updating flashcopy configurations. The information is broken into two (2) parts: 'Flashset LCU Offsets' and 'Final Flashset Build'. Both allow the user to view all the information provided in the FLASHSET document in an organized manner (with the exception of jobnames).

In the 'Flashset LCU Offsets' section, the data is broken up into Flashset section, followed by the box names. Within each box name, a list of every source LCU (not ranges) is mapped to its intended target LCU. For instance, in the picture above, an XRC secondary device that is defined to LCU 58 on BOX18, will be flashed to LCU A8 on BOX18.

In the 'Final Flashset Build' section, a list of the resulting information is provided to Zero Suspend Flashcopy, organized by each flashset name. Keep in mind that the second parameter in the device list is not a device number, rather a combination of LCU and CCA values of the target device, followed by the copy mode of the flashcopy relationship. For instance, device 8B02 will be flashed to LCU 7C CCA 02 with mode Copy.

If a device is highlighted in blue, this indicates that this volume is going to be flashed with mode FREEZE (indicated by the X parameter). This flashcopy mode is used to take an accurate Zero Suspend Flashcopy by only freezing the Master dataset volume and every sessions Control dataset volume.

The user can add multiple flashsets to this configuration to maintain consistency with a subset of sessions. In an exemplary embodiment, four (4) flashsets are used in the configurations to build out different environments: ALLVOLUMES->takes a flashcopy of the entire set of XRC data to recover in BCP in the event of a test or true disaster, FLASH02->takes a flashcopy of an application into the HA (high availability) environment so that the application can run side by side with production, FLASH04->takes a flashcopy of a group of applications that run idle in the HA environment, but can run production data if the need would arise, and FLASH01->a pre-batch safety net copy in case batch processing in production would go awry.

PPRC Config: The PPRC Config tab allows the user to display the current volume definitions given in the GDPS/PPRC Config01 member. They can then take that information and compare it against both the current and future XRC Config01 data. To display the compare data, the user will need to first use the 'Load PPRC Config' button.

Figure 8:
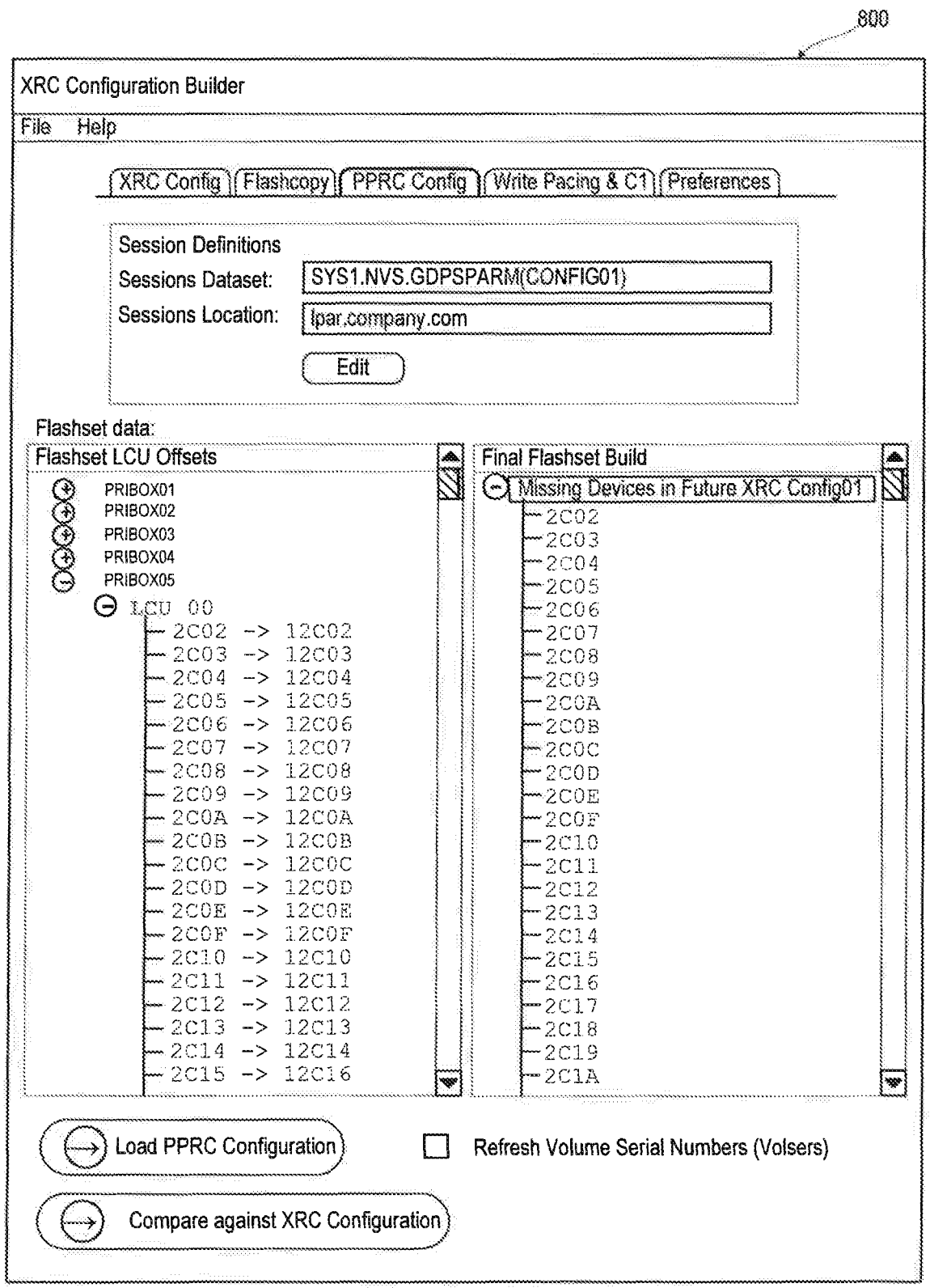
FIG. 8 illustrates a depiction of the graphical user interface presenting a peer to peer remote copy (PPRC) configuration builder window, according to one or more embodiments.

During the compare process, the XRC Config01 Builder application will compare the current PPRC devices with those that are being mirrored and will be mirrored with XRC (again both the current and the future XRC configurations). It will then compare all the XRC mirrored devices (whose sessions are of type MIGMZGM and MZGM) with those that are mirrored with PPRC. For Example:

FIG. 8 illustrates a GUI window 800 for PPRC configuration that shows that there are missing devices from the 'Future XRC Config01' configuration (to be highlighted in red). It then lists the devices that are currently missing. The user can reference these devices on the left-hand panel to see what box and LCU the devices are defined to. Once the user knows that information, the user can reference what session the device is defined to on the 'XRC Config' tab, and make changes accordingly.

Figure 9:
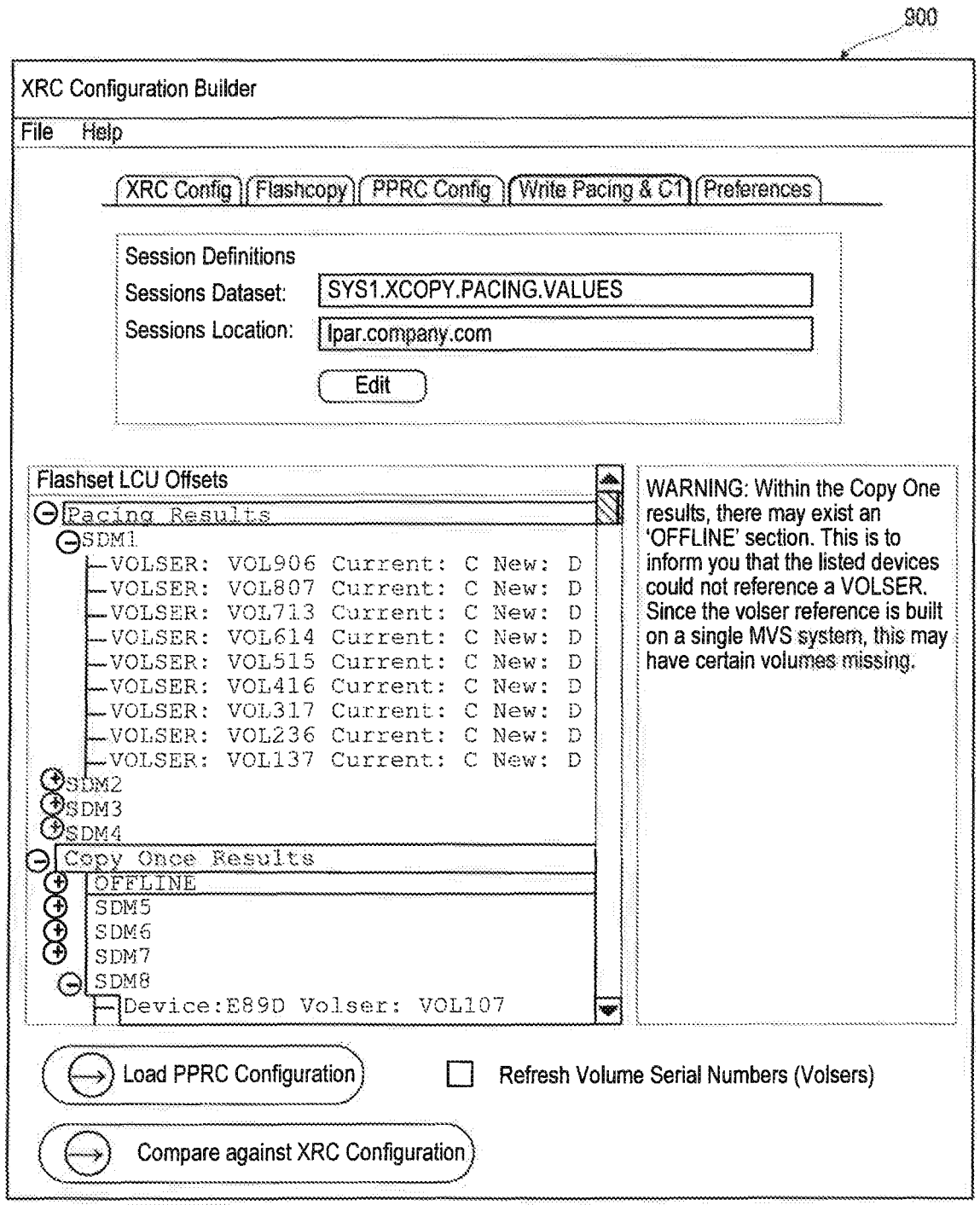
FIG. 9 illustrates a depiction of the graphical user interface presenting a first write pacing and C1 configuration builder window, according to one or more embodiments.

FIG. 9 illustrates a GUI window 900 for configuring "Write Pacing & C1". This tab is used to query the existing XRC environment for any changes that might need to be made according to the SYS1.XCOPY.PACING.VALUES dataset. These changes are broken down into 2 categories: pacing and copy once changes, both of which are defined in the PACING.VALUES dataset and are discovered at the same time.

To begin, click on the 'Check Pacing & C1' button. This will download all the necessary information (XRC Config, Volser dataset, and Pacing.Values dataset), followed by querying all the active XRC sessions. When all the data is obtained, the application looks at the XRC query information to determine if volsers are set with the appropriate pacing level or if they need to be moved to a copy once session. It then checks to see if any sessions are not active (copy once), and if so, references these devices in the volser dataset and checks to see if they belong in a copy once session or not.

There are distinct sections created after checking for any pacing and C1 changes. In the Pacing section at the top, the application provides the user with a listing of sessions that have volumes needing attention. These volumes are provided to the user with the current volser, its current pacing level, and what the pacing level should read.

Figure 10:
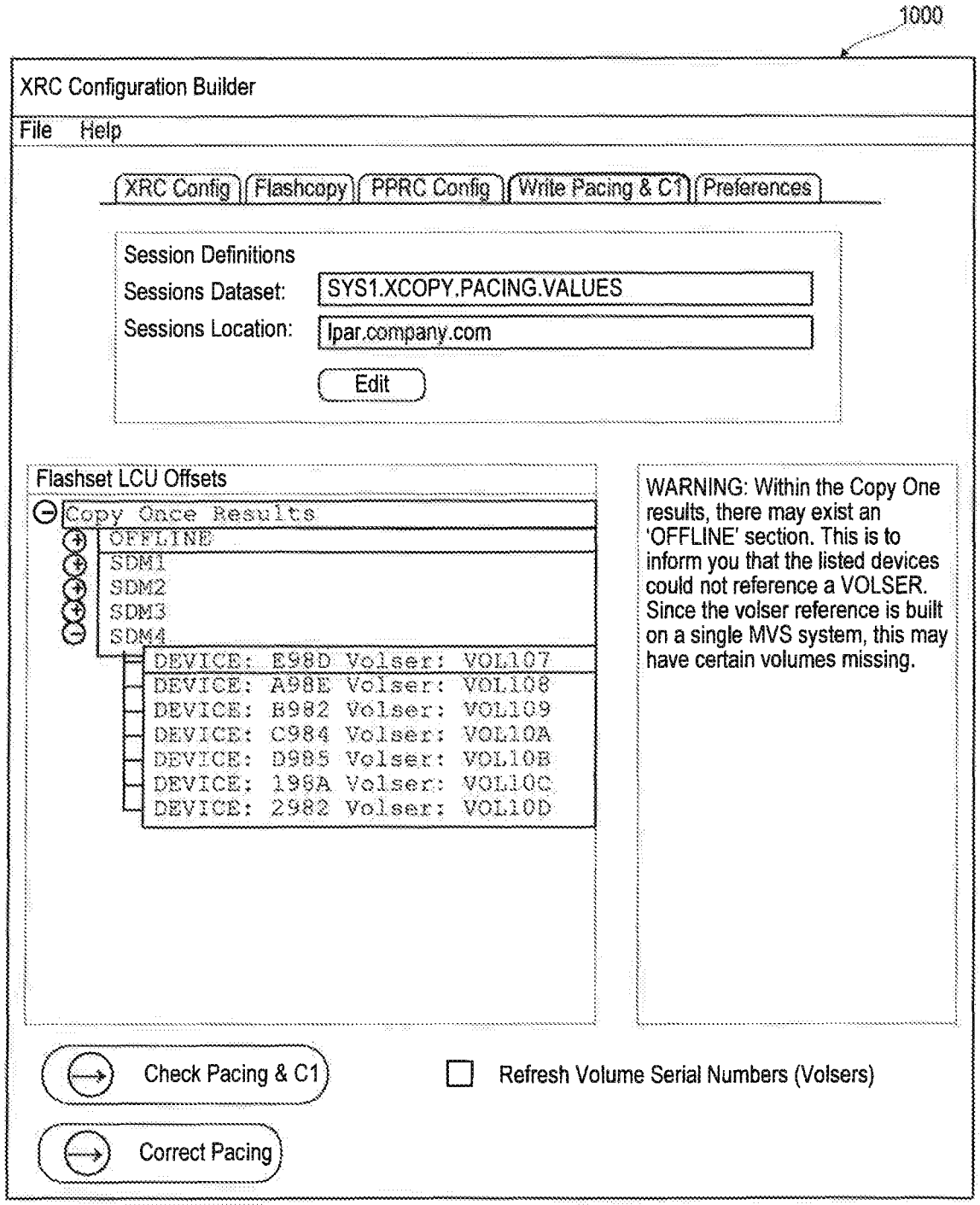
FIG. 10 illustrates a depiction of the graphical user interface presenting a second write pacing and C1 configuration builder window, according to one or more embodiments.
Figure 11:
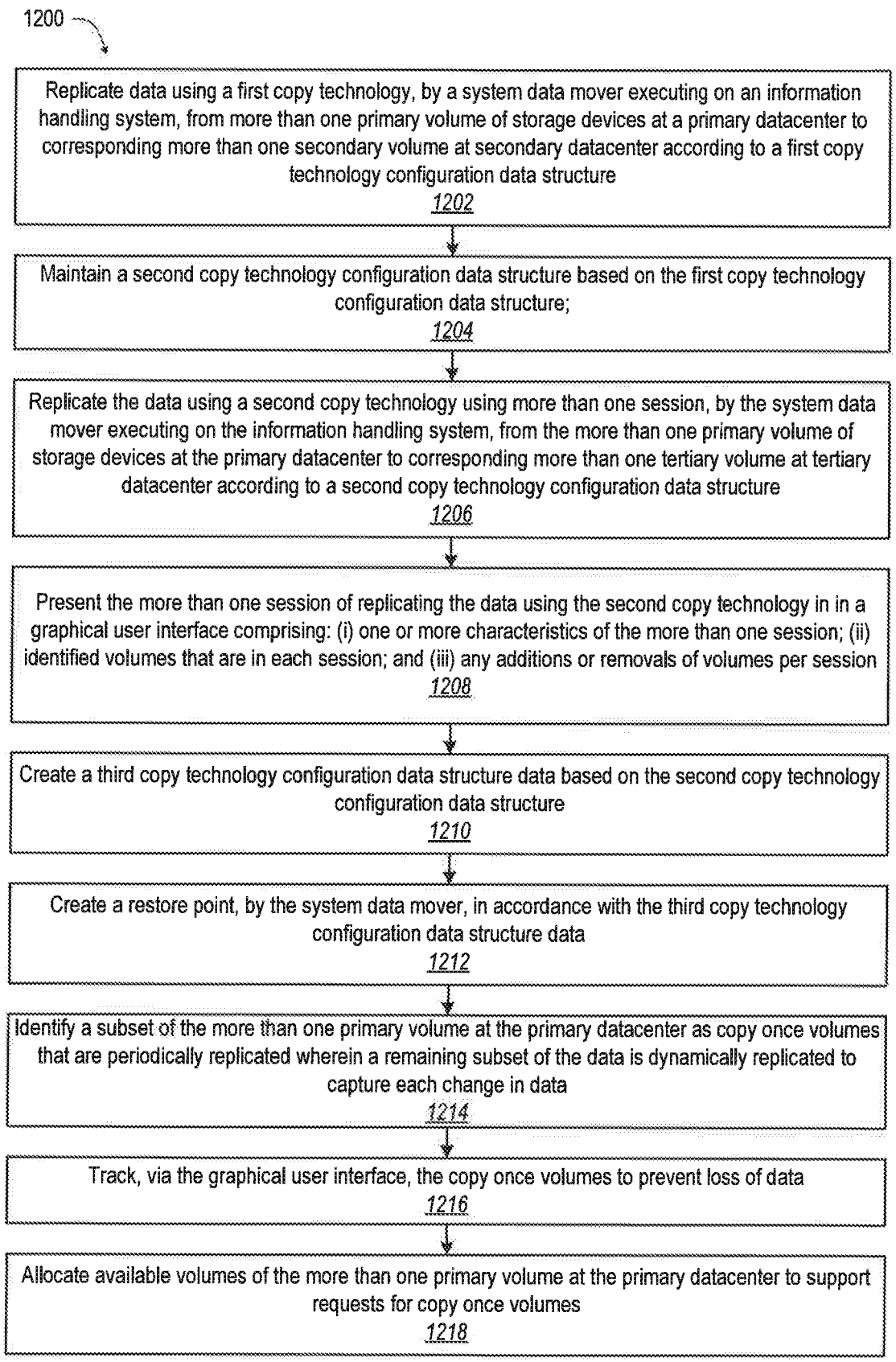
FIG. 11 illustrates a flow diagram of a method of three-site data duplication for disaster recovery, according to one or more embodiments.

FIG. 10 illustrates a GUI window 1000 in which the user is presented with a list of sessions that have volumes that need to be moved to copy once sessions (or copy once sessions that have volumes that need to be moved to normal sessions). The device and volser are provided so that the user can make changes to the SESSIONS document to properly reflect the necessary changes. When a volume has been moved to its proper location within the SESSIONS document, but before the current CONFIG01 has been modified, the device will change from a red highlight to a green highlight (after another 'Check Pacing & C1' has been processed). For example, a single volume has been moved to a copy once location and can be indicated by the color turning green.

The Preferences tab presents the user with a graphical version of the XRC Config Builder.conf. Changes can be made to any one of the fields, but the changes will not be saved. Once the user closes the program all the changes will be lost. This is so that the user can make temporary changes without affecting other users. If the user makes changes, and wants to revert to the default selection the user can simply use the 'Load Preferences' button. If the user has an alternate configuration to load, simply change the filename defined in the Global Preferences Filename field at the top, and press the 'Load Preferences' button.

Figure 12:
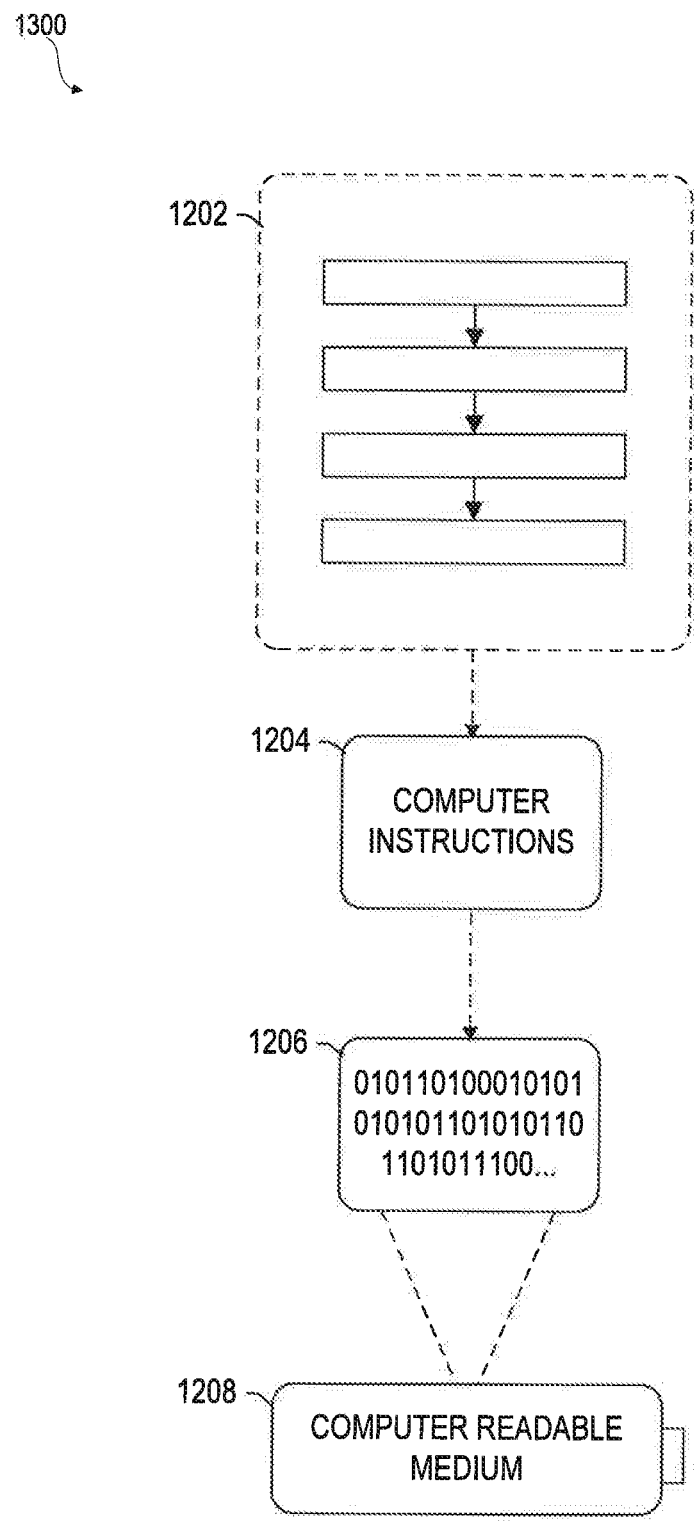
FIG. 12 illustrates a block diagram of example computer-readable medium or computer-readable device including processor-executable instructions configured to embody one or more of the provisions set forth herein, according to one or more embodiments.

FIG. 12 illustrates a method 1200 for, according to one or more embodiments. At 1202, method 1200 includes replicating data using a first copy technology. A system data mover executes on an information handling system to perform the replication from more than one primary volume of storage devices at a primary datacenter to corresponding more than one secondary volume at secondary datacenter. The system data mover performs the data replication according to a first copy technology configuration data structure. In one or more embodiments, the first copy technology is peer to peer remote copy (PPRC). At 1204, method 1200 includes maintaining a second copy technology configuration data structure based on the first copy technology configuration data structure. At 1206, method 1200 includes replicating the data using a second copy technology using more than one session. The system data mover executing on the information handling system performs the replication. The data from the more than one primary volume of storage devices at the primary datacenter is replicated to corresponding more than one tertiary volume at tertiary datacenter. The replication is performed according to a second copy technology configuration data structure. In one or more embodiments, the second copy technology is extended remote copy (XRC). At 1208, method 1200 includes presenting the more than one session of replicating the data using the second copy technology in in a graphical user interface comprising: (i) one or more characteristics of the more than one session; (ii) identified volumes that are in each session; and (iii) any additions or removals of volumes per session. At 1210, based on the second copy technology configuration data structure, method 1200 includes creating a third copy technology configuration data structure data. At 1212, method 1200 includes creating a restore point, by the system data mover, in accordance with the third copy technology configuration data structure data. In one or more embodiments, the third copy technology is flashcopy. At 1214, method 1200 includes identifying a subset of the more than one primary volume at the primary datacenter as copy once volumes that are periodically replicated wherein a remaining subset of the data is dynamically replicated to capture each change in data. At 1216, method 1200 includes tracking, via the graphical user interface, the copy once volumes to prevent loss of data. At 1218, method 1200 includes allocating available volumes of the more than one primary volume at the primary datacenter to support requests for copy once volumes.

Still another embodiment involves a computer-readable medium including processor-executable instructions configured to implement one or more embodiments of the techniques presented herein. An embodiment of a computer-readable medium or a computer-readable device devised in these ways is illustrated in FIG. 13, wherein an implementation 1300 includes a computer-readable medium 1308, such as a CD-R, DVD-R, flash drive, a platter of a hard disk drive, etc., on which is encoded computer-readable data 1306. This computer-readable data 1306, such as binary data including a plurality of zero's and one's as shown in 406, in turn includes a set of computer instructions 1304 configured to operate according to one or more of the principles set forth herein. In one such embodiment 1300, the processor-executable computer instructions 1304 may be configured to perform a method 1302, such as method 1200 of FIG. 12. In another embodiment, the processor-executable instructions 404 may be configured to implement a system, such as the system 300 of FIG. 3. Many such computer-readable media may be devised by those of ordinary skill in the art that are configured to operate in accordance with the techniques presented herein.

By virtue of the foregoing, the present innovation provides the management and generation of z/OS GDPS or Flashcopy configuration data for a three (3) site disaster recovery solution, including managing a large amount of information for multiple types of data replication with validation. The present innovation can run on multiple systems and is not dependent on any particular existing configuration. The present innovation can theoretically be used to manage and configure any three (3) site XRC disaster recovery solution. In particular, the present innovation provides massive replication environment for mainframe environment by using PPRC as one form of replication along with XRC as a long-distance form of replication for disaster recovery fulltime to never lose data. Flash copy is used back of copy at point of time for recovery without losing "golden copy".

The present innovation manages an XRC environment on a volume/harddrive basis of 30 k at a time. In a particular embodiment, an XRC Configurator manages in sessions with 1000 of the 30 k being handled per session. Users can see sessions at a high level: (i) characteristics of sessions; (ii) what volumes are in session; and (iii) can see additions or removals of volumes with regard to sessions.

Rather than allocate an uneconomical amount of additional storage space of Copy One volumes, the XRC Configurator enables users of a DASD team to judicially reassign Copy One volumes. Copy one volumes are not continuously replicated because low value data. For example, Copy Once volumes may be copied once per week to avoid bogging down IP lines between datacenters. The present innovation facilitates moving Copy One volumes around the three-site data recovery solution. Dynamic allocation and reallocation of Copy One volumes allows spare volumes that are not allocated to be put into Copy One pool. Thereby, expense and inefficiency are avoided of having a Copy One pool that sits idle until needed on occasion. Volumes being moved into or out of the Copy One pool are tracked to avoid losing data.

The XRC Configurator can automatically change configuration of a Flashcopy to correspond to changes to the XRC configuration for an accurate restore point. Typical Excel spreadsheet of 30 k entries for each of the XRC configuration and Flashpoint configuration are handled automatically rather than manually. Uses of zero suspend XRC Configurator determines what volumes need to be frozen for an accurate Flashcopy restore point. Flashcopy freezes input/output (I/O) to volumes used by XRC. The XRC Configurator queries Copy One session to determine where volumes should go, error checks where the volumes are supposed to go, and recommends changes if errors are detected. Little sessions are grouped in a master session.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system comprising:
a processor coupled to a memory that stores instructions that when executed by the processor cause the processor to:
convey in a graphical user interface a visual representation of a current configuration for a first technique of a plurality of techniques associated with replicating volumes from a primary datacenter to two or more secondary datacenters, wherein the graphical user interface comprises an Extended Remote Copy Configuration tab displaying Extended Remote Copy changes, an Extended Remote Copy configurator configured to change configuration of a point-in-time copy to correspond to Extended Remote Copy changes, and a Flashcopy tab comprising a Flashset document configured to be modifiable by user input;
receive a change to the current configuration, wherein the current configuration and the change are included in a future configuration;
analyze the future configuration for a replication error;
generate an updated visual representation that identifies the replication error; and
transmit data associated with the updated visual representation.

2. The system of claim 1, wherein the instructions further cause the processor to output the future configuration to a file for use in directing performance of a replication system in response to a request received by way of the visual representation.

3. The system of claim 1, wherein the instructions further cause the processor to:
automatically generate a second configuration for a second technique based on the future configuration of the first technique;
create a visual representation of the second configuration; and
transmit data associated with the visual representation of the second configuration.

4. The system of claim 3, wherein the first technique is an asynchronous remote copy and the second technique is a point in time copy.

5. The system of claim 1, wherein the replication error is associated with data loss.

6. The system of claim 5, wherein the replication error is a lack of replication of a volume.

7. The system of claim 1, wherein the change is associated with a copy of one or more volumes including non-critical data that is not continuously copied.

8. The system of claim 7, wherein the change is to add or remove the copy.

9. The system of claim 1, wherein the plurality of techniques comprises asynchronous, point in time, and synchronous replication.

10. A method comprising:
conveying in a graphical user interface a visual representation of a current configuration for a first technique of a plurality of techniques associated with replicating volumes from a primary datacenter to two or more secondary datacenters, wherein the graphical user interface comprises an Extended Remote Copy Configuration tab displaying Extended Remote Copy changes, an Extended Remote Copy configurator configured to change configuration of a point-in-time copy to correspond to Extended Remote Copy changes, and a Flashcopy tab comprising a Flashset document configured to be modifiable by user input;
receiving a change to the current configuration, wherein the current configuration and the change are included in a future configuration;
analyzing the future configuration for a replication error;
generating an updated visual representation that identifies the replication error; and
transmitting data associated with the updated visual representation.

11. The method of claim 10, further comprising outputting the future configuration to a file for use in directing performance of a replication system in response to a request received by way of the visual representation.

12. The method of claim 10, further comprising:
automatically generating a second configuration for a second technique based on the future configuration of the first technique;
creating a visual representation of the second configuration; and
transmitting data associated with the visual representation of the second configuration.

13. The method of claim 12, wherein the first technique is an asynchronous remote copy and the second technique is a point in time copy.

14. The method of claim 10, wherein the replication error is associated with data loss.

15. The method of claim 14, wherein the replication error is a lack of replication of a volume.

16. The method of claim 10, wherein the change is associated with a copy of one or more volumes including non-critical data that is not continuously copied.

17. The method of claim 16, wherein the change is to add or remove the copy.

18. The method of claim 10, wherein the plurality of techniques comprises asynchronous, point in time, and synchronous replication.

19. A non-transitory computer readable medium comprising program code, which, when executed by one or more processors causes the one or more processors to:

convey in a graphical user interface a visual representation of a current configuration for a first technique of a plurality of techniques associated with replicating volumes from a primary datacenter to two or more secondary datacenters, wherein the graphical user interface comprises an Extended Remote Copy Configuration tab displaying Extended Remote Copy changes, an Extended Remote Copy configurator configured to change configuration of a point-in-time copy to correspond to Extended Remote Copy changes, and a Flashcopy tab comprising a Flashset document configured to be modifiable by user input;

receive a change to the current configuration, wherein the current configuration and the change are included in a future configuration;

analyze the future configuration for a replication error;

generate an updated visual representation that identifies the replication error; and transmit data associated with the updated visual representation.

20. The non-transitory computer readable medium of claim 19, further comprising program code that, when executed by the one or more processors, causes the one or more processors to output the future configuration to a file for use in directing performance of a replication system in response to a request received by way of the visual representation.

* * * * *